United States Patent
Cheng et al.

(10) Patent No.: US 10,225,884 B2
(45) Date of Patent: Mar. 5, 2019

(54) METHOD FOR INITIALIZING PROTECTION DEVICE AND PROTECTION DEVICE IN WIRELESS MICROPHONE BEACON SYSTEM

(75) Inventors: Jinxia Cheng, Beijing (CN); David Mazzarese, Suwon-si (KR)

(73) Assignees: Samsung Electronics Co., Ltd., Suwon-si (KR); Beijing Samsung Telecom R&D Center, Beijing (CN)

( * ) Notice: Subject to any disclaimer, the term of this patent is extended or adjusted under 35 U.S.C. 154(b) by 889 days.

(21) Appl. No.: 12/677,487

(22) PCT Filed: Sep. 9, 2008

(86) PCT No.: PCT/KR2008/005316
§ 371 (c)(1),
(2), (4) Date: Mar. 10, 2010

(87) PCT Pub. No.: WO2009/035250
PCT Pub. Date: Mar. 19, 2009

(65) Prior Publication Data
US 2010/0195505 A1    Aug. 5, 2010

(30) Foreign Application Priority Data

Sep. 10, 2007    (CN) .......................... 2007 1 0149804

(51) Int. Cl.
*H04W 8/00*        (2009.01)
*H04W 16/14*    (2009.01)
(Continued)

(52) U.S. Cl.
CPC ............ *H04W 84/18* (2013.01); *H04W 8/005* (2013.01); *H04W 48/12* (2013.01)

(58) Field of Classification Search
CPC ..... H04W 8/005; H04W 16/14; H04W 48/12; H04W 84/18
See application file for complete search history.

(56) References Cited

U.S. PATENT DOCUMENTS 6,331,972 B1    12/2001    Borgstahl et al.
6,907,238 B2    6/2005    Leung
(Continued)

FOREIGN PATENT DOCUMENTS

CN              1650642 A       8/2005
KR    10-1999-0064319 A    7/1999
(Continued)

OTHER PUBLICATIONS

IEEE Standard for Information Technology—Telecommunications and information exchange between systems—Local and metropolitan are networks—Specific Requirements—Part 22.1:: Enchanced Protection for Low-Power, Licensed Devices Operating in Television Broadcast Bands. IEEE Society PDF ISBN 07381-4997-7 SS95552; Published on Sep. 8, 2006. pp. 1, 63-74 and 99-123.*

(Continued)

*Primary Examiner* — Xavier Szewai Wong
(74) *Attorney, Agent, or Firm* — Jefferson IP Law, LLP (57) ABSTRACT

A method for initializing a protection device PD comprising steps of: receiving by a beacon receiver beacon information from other protection devices around the PD; sending by the beacon receiver the received beacon information to a channel monitoring decision maker within a time period set in a channel monitoring timer; determining by the channel monitoring decision maker whether there exists any primary beacon transmission device PPD; if yes, deciding the PD as a secondary beacon transmission device SPD; if no, deciding the PD as a PPD; receiving by an initialization process decision maker a determination result from the channel monitoring decision maker and determining an operation status of the PD within a time period set in the initialization process timer; outputting by the initialization process decision maker the determination result to a transmitter of the (Continued)

PD to decide whether the transmitter has transmitted any data or request information.

18 Claims, 7 Drawing Sheets

(51) Int. Cl.
*H04W 48/12* (2009.01)
*H04W 84/18* (2009.01)

(56) References Cited

U.S. PATENT DOCUMENTS

| | | | |
|---|---|---|---|
| 7,151,446 | B2 | 12/2006 | Culpepper et al. |
| 8,228,785 | B2* | 7/2012 | Ji .................. H04W 48/02 |
| | | | 370/217 |
| 2003/0185244 | A1 | 10/2003 | Wu et al. |
| 2003/0188028 | A1* | 10/2003 | Kawamura ............ 709/249 |
| 2004/0136318 | A1* | 7/2004 | Bentley ................. 370/221 |
| 2005/0177639 | A1* | 8/2005 | Reunamaki et al. ..... 709/227 |
| 2006/0274643 | A1 | 12/2006 | Choyi et al. |
| 2007/0253345 | A1* | 11/2007 | Habetha et al. ........ 370/254 |
| 2008/0247366 | A1* | 10/2008 | Celentano et al. ...... 370/338 |
| 2009/0011756 | A1* | 1/2009 | Ji .................. H04W 16/14 |
| | | | 455/424 |
| 2009/0154342 | A1* | 6/2009 | Oltman et al. .......... 370/220 |
| 2009/0275292 | A1* | 11/2009 | Chang .................... 455/69 |
| 2010/0067428 | A1* | 3/2010 | Cordeiro et al. ........ 370/315 |
| 2010/0135224 | A1* | 6/2010 | Chen et al. ............. 370/329 |

FOREIGN PATENT DOCUMENTS

| | | |
|---|---|---|
| WO | 97/15159 A2 | 4/1997 |
| WO | 2007/031956 A2 | 3/2007 |

OTHER PUBLICATIONS 22-07-0347-00/0001, IEEE 802.22-07/0347r0 "Efficient way to get and set Multiple MIB attributes" Jul. 2007.*

22-07-0349-00-0001, IEEE 802.22-07/0349r0 "The chart for Initialization of an SPD" Jul. 2007.*

Lv et al., Backup Primary Protecting Devices for Beacon Devices, IEEE 802.22-07/0007r0, Jan. 5, 2007.

Brown, TG1 Preliminary (Unapproved) Draft Standard for P802.22.1, Apr. 3, 2007, pp. 1-64, IEEE 802.22-06/0238r2, XP017657943, Piscataway, New Jersey.

Wu et al., TG1 Text Change Draft Prepared with Huawei's Proposals, Mar. 6, 2007, pp. 1-43, IEEE 802.22.07/0089r1, XP017742048, Piscataway, New Jersey.

IEEE Computer Society, Part 22.1: Enhanced Protection for Low-Power, Licensed Devices Operating in Television Broadcast Bangds, IEEE Standard for Information Technology—Telecommunications and Information Exchange Between Systems—Local and Metropolitan Area Networks—Specific Requirements, May 1, 2007, pp. 1-83, P802.22.1/D1, XP040394902, Piscataway, New Jersey.

Lv et al., IEEE P802.22 Wireless RANs Enhancement of RTS and ACK Design for the IEEE 802.22.1 Standard, Jan. 25, 2007, pp. 1-15, IEEE 802.22-07/0011r0, XP017657847, Piscataway, New Jersey.

* cited by examiner

METHOD FOR INITIALIZING PROTECTION DEVICE AND PROTECTION DEVICE IN WIRELESS MICROPHONE BEACON SYSTEM

BACKGROUND OF THE INVENTION

1. Field of the Invention

Present invention relates to a wireless communication system field based on cognitive radio, especially to a method for initializing protection device in the IEEE802.22.1 wireless microphone beacon system.

2. Description of the Related Art

With development of a technique of cognitive radio based on dynamic spectrum allocation and an application of equipments with unauthorized frequency bands, quick and reliable radio control channel is increasingly required. This control channel can be established with radio beacons. It is typically required that these beacons be robust to all kinds of radio channels. In addition, to avoid causing interference to authorized radio equipments or other unauthorized radio equipments, the beacon should be short with very low transmission power. And a beacon defined in IEEE802.22.1 is a typical one that meets demands mentioned above.

In general, two kinds of beacon transmission device, namely a primary beacon transmission device (PPD) and a secondary beacon transmission device (SPD) respectively, are defined in protocol IEEE802.22.1. PPD plays a leading role in controlling the transmission of the beacon. Therefore, in most cases, PPD transmits the beacon to SPD and a consumer premise equipment (CPE) in a wireless regional access network (WRAN). In some specified time slots, it is necessary for the SPD to intermittently transmit beacon data to PPD to allow the PPD to combine all beacon data so as to obtain information such as integral channel occupation ratio and a geography location and so on, and then broadcast it to the CPE.

Figure 1:
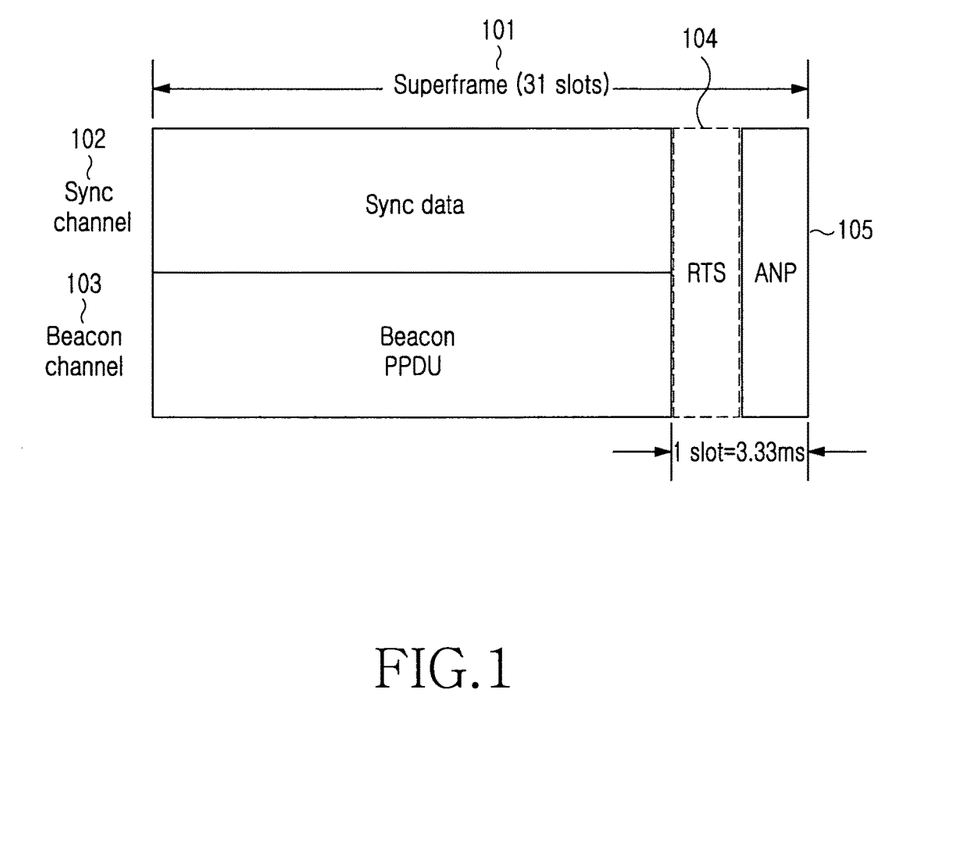
FIG. 1 shows a diagram of structure of a super frame in non-initialization stage in a draft of standard IEEE802.22.1D1.0.

A structure of a super frame defined in protocol IEEE802.22.1D1.0 is illustrated in FIG. 1. A super frame 101 contains 31 time slots. Each slot contains 32 DQPSK symbols. And a super frame is composed of two parallel logic channels. The first one is a synchronization channel 102. And the second is a beacon channel 103. The synchronization channel 102 includes a series of synchronization bursts. This super frame also contains a specified time slot, comprising an enough turn-round time for PPD and SPD to perform coding and decoding, a receiving period RTS (Request To Send) 104 and an ANP (Acknowledgement/No Acknowledgement Period) 105 for the transmission of ACK/NACK.

During the RTS period 104, the PPD monitors the beacon transmission request information from the SPD. And during the ANP 105, the PPD broadcasts determination information on whether the beacon information could be transmitted by SPDs or not and which SPD could perform this task.

Figure 2:
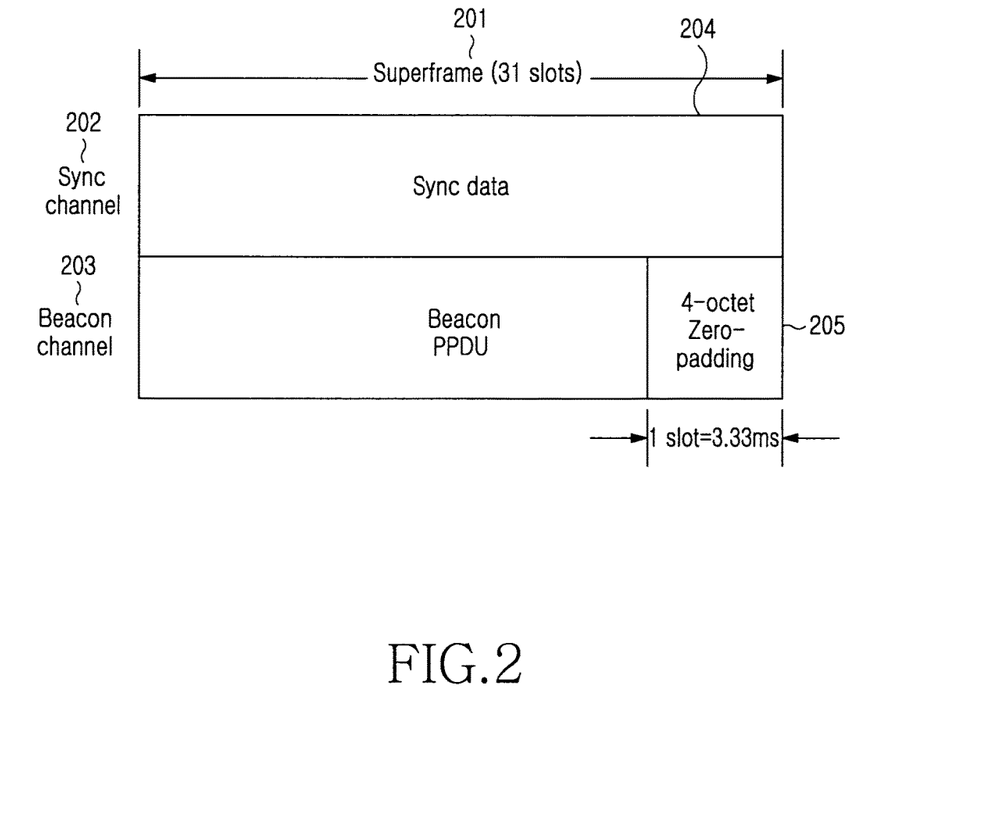
FIG. 2 shows a diagram of structure of a super frame in initialization stage in a draft of standard IEEE802.22.1D1.0.

It should be noted that when a PD is powered on, it is necessary to detect whether any PPD exists in the current channel or not. And this detect processing lasts 2+0.1 m (m∈[0,100]) seconds. Then an initialization process for a device is implemented in following two cases:

In the case that no PPD exists in current channel, the PD which is just powered on acts as a PPD and the device initialization process lasts 30 seconds. During the initialization process, the structure of the Beacon frame is illustrated in FIG. 2. The super frame is composed of two parallel logic channels. The first logic channel is a synchronization channel 202, and the second is a beacon channel 203. Differing from that shown in FIG. 1, the synchronization channel 202 occupies the entire 31 time slots, and the beacon channel 203 consists of 30 time slots of PPDU data and a slot of zero padding information.

Figure 3:
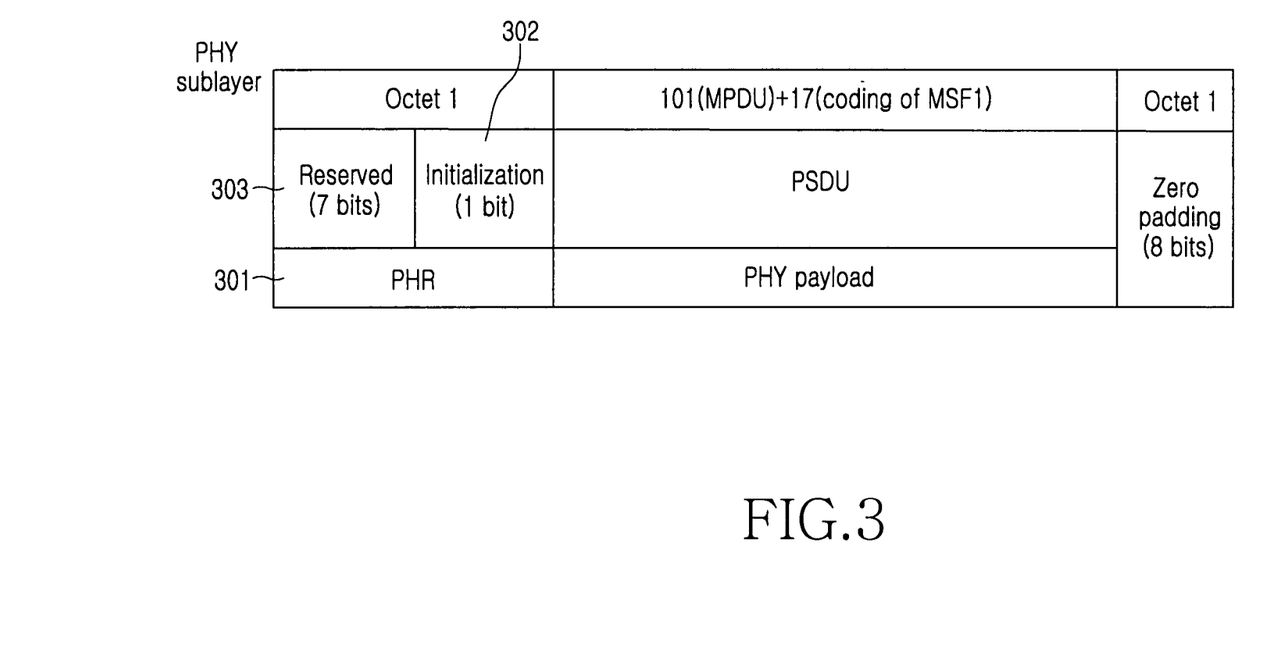
FIG. 3 shows a physical frame structure in a draft of standard IEEE802.22.1D1.0.

In the structure of the Beacon physical layer PPDU frame shown in FIG. 3, a first byte 301 of a frame is PHR information, containing seven reserved bits 303 and one initialization bit 302. If PPD is in the initialization stage, which lasts 30 seconds, the initialization bit is set as "1" by a PPD high layer.

In the case that some PPD already exists in current channel, the PD which is just powered on acts as an SPD and receives the beacon frame from PPD. By checking whether the initialization bit is "1" or not, the SPD determines whether the PPD is in initialization stage or not.

In present IEEE802.22.1D1.0, only one bit is defined as the initialization bit. And how to correctly receive this initialization bit information is one of the future tasks of the present standard. In present task force, some relevant solutions have been proposed on this problem. For example: Samsung company puts forward that the initialization bit is repeated in a frame to determine whether the PPD is in initialization stage or not by the rule that most information bits are correctly received in the receiver, while Huawei Corporate suggests that several continuous correct initialization bits be received to determine whether the PPD is in initialization stage or not in the premise that number of initialization 1 bit is kept unchanged in the PHR of the beacon frame.

In solution 1, i.e., to repeat the initialization bit in a frame, the implementation is very simple and easy, but no obvious improvement for the receiver in regard to the initialization 1 bit in the case that the channel varies slowly or a signal-to-noise ratio is very low;

In solution 2, i.e., to receive the initialization bits in several continuous frames, accuracy of the judgment can be improved. However, more receive delay is introduced in the system so that complexity is increased in the receiver.

By far, no final solution is approved by IEEE802.22TG1 task force.

SUMMARY OF THE INVENTION

An object of this invention is to provide a method for initializing protection device PD in an IEEE802.22.1 wireless microphone beacon system.

To achieve the object mentioned above, a method for initializing one protection device PD in a wireless microphone beacon system comprising steps of:

receiving by a beacon receiver beacon information from other protection devices around the PD;

sending by the beacon receiver the received beacon information to a channel monitoring decision maker within a time period set in a channel monitoring timer;

the channel monitoring decision maker determines whether there exists any PPD;

if yes, deciding the PD as an SPD;

if no, deciding the PD as a PPD;

receiving by an initialization process decision maker determination result from the channel monitoring decision maker and determining an operation status of the PD within a time period set in the initialization process timer;

outputting by the initialization process decision maker the determination result to a transmitter of the PD to decide whether the transmitter has transmitted any data or request information.

With the method proposed in present invention, not only initialization bits in existing draft of standard IEEE802.22.1 have been saved, but also the design of PD is simplified in virtue of a timer. In addition, it is not necessary for present invention to modify any other existing process in the beacon system.

BRIEF DESCRIPTION OF THE DRAWINGS

FIG. 4 is a block diagram of PD and wireless microphone according to present invention, where (a) is a block diagram of PD; (b) is the schematic diagram of PD built-in wireless microphone; and (c) is a schematic diagram wireless microphone which is outside the PD;

FIG. 5 illustrates an operation flow that the PD according to present invention implements an initialization process after it is powered on.

DETAILED DESCRIPTION OF THE PREFERRED EMBODIMENTS

Figure 4A:
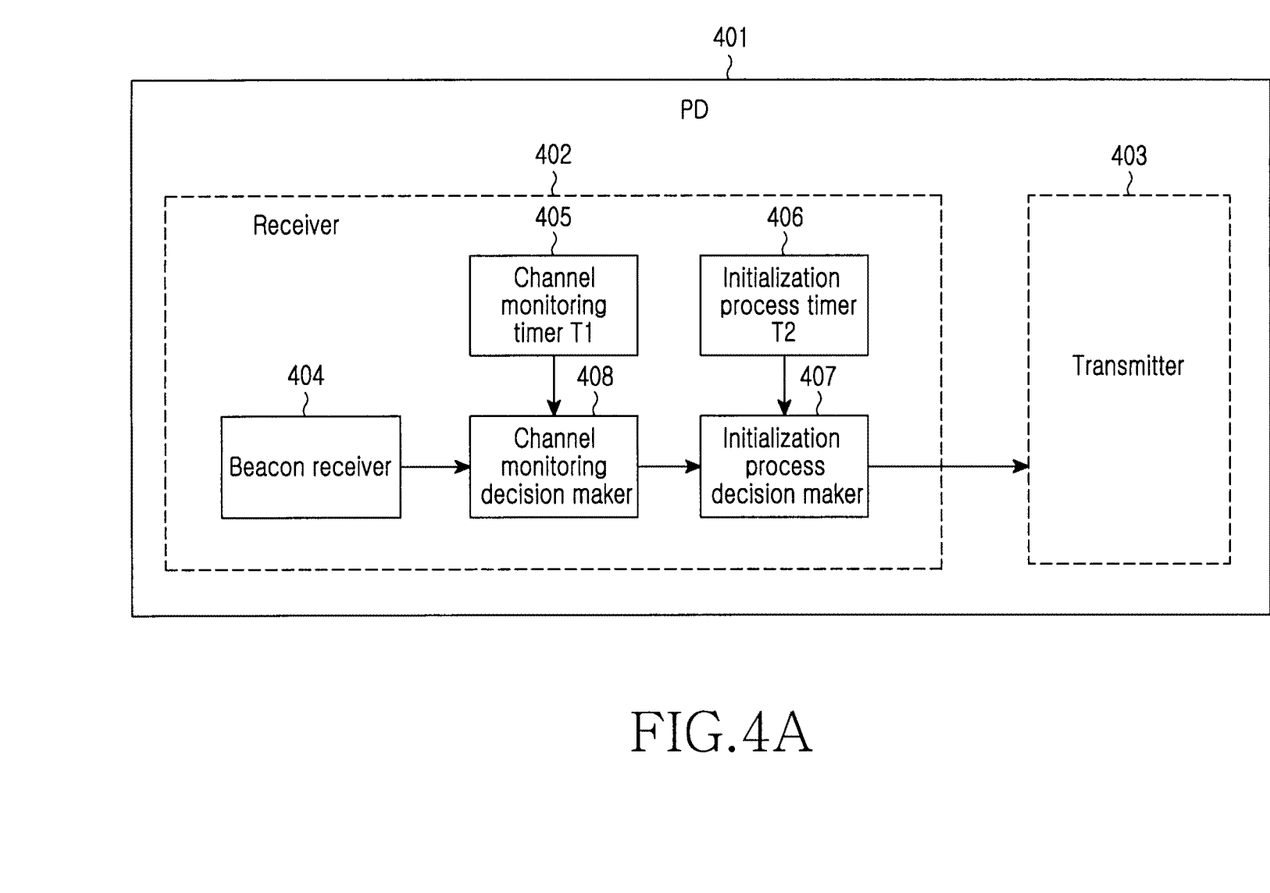

FIG. 4(a) is a function block diagram of the PD according to present invention. Here, a protection device PD (401) may include a receiver (402) and a transmitter (403). And the receiver (402) contains a Beacon receiver (404), a channel monitoring timer T1 (405), a channel monitoring decision maker (408), an initialization process timer T2 (406) and an initialization process decision maker (407).

For the receiver (402), the Beacon receiver (404) is used for detecting and receiving Beacon information from PD around. The channel monitoring decision maker (408) is used for making a determination on the monitored result according to detecting result from the Beacon receiver (404). Under the control of the channel monitoring timer T1 (405), then it make a decision within a specified T1 period whether there exists any PPD around this PD or not. The initialization process decision maker (407) is used for determining whether the PD (401) initialization process completes or not according to the information from both the channel monitoring decision maker (408) and the initialization process timer (406). If the channel monitoring decision maker (408) determines that the PD (401) is a PPD, then according to the information from both the initialization process decision maker (407) and the initialization process timer T2 (406), successive Beacon frames shown in FIG. 2 are determined to transmit in a coming T2 period. And if the channel monitoring decision maker (408) determines that the PD (401) is an SPD, then according to the information from both the initialization process decision maker (407) and the initialization process timer T2 (406), the PD (401) transmits no information such as request information but to stay in receiving state in the coming T2 period.

Next, the determination result from the initialization process decision maker (407) is sent to the transmitter (403) of the PD (401) to determine whether the transmitter is in service or not.

To make the wireless microphone operate normally by using the PD, it is necessary to make relevant modifications to the structure of the wireless microphone. The architecture of a wireless microphone device (409) with the function of Beacon, which is formed by a wireless microphone device (410) and a PD (413) cooperatively, is illustrated in FIGS. 4(b) and 4(c).

Figure 4B:
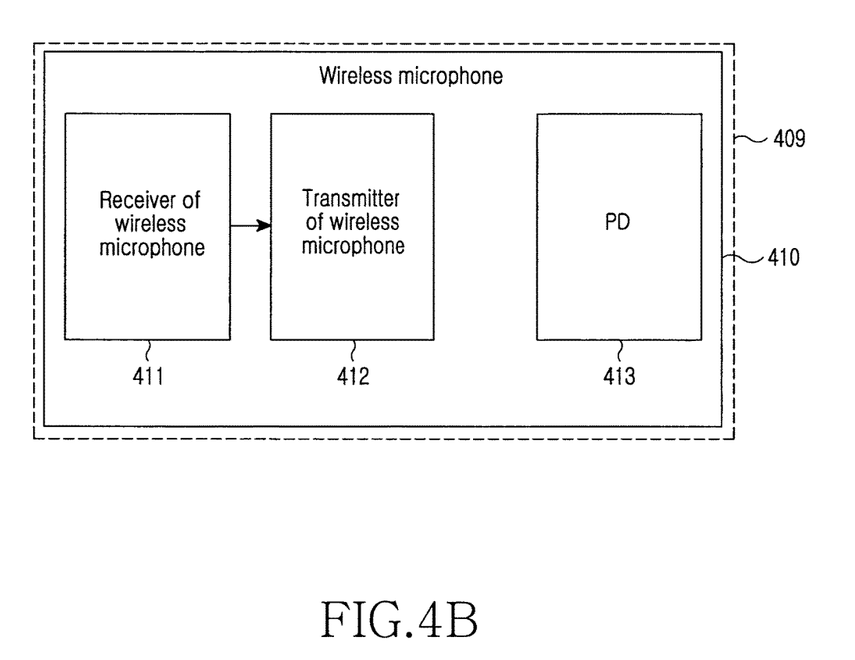

In FIG. 4(b), the wireless microphone device (409) with the function of Beacon means the PD (413) inside the wireless microphone device (410). That is to say, the wireless microphone device (410) includes the wireless microphone receiver (411), the wireless microphone transmitter (412) and the PD (413).

Figure 4C:
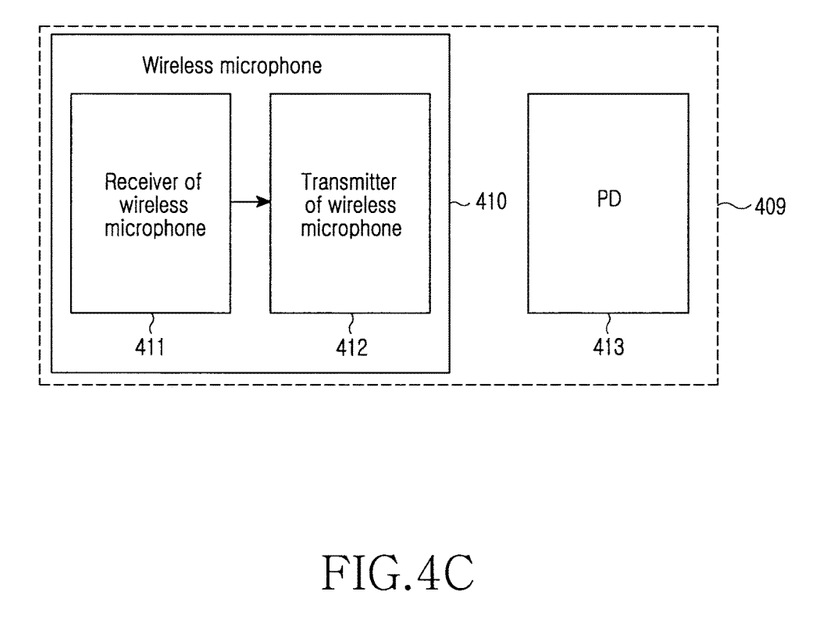

In FIG. 4(c), the wireless microphone device (409) with the function of Beacon distinguishes the PD (413) from the wireless microphone device (410). That is to say, the wireless microphone device (410) only consists of the wireless microphone receiver (411) and the wireless microphone transmitter (412) with the PD (413) outside the wireless microphone device (410).

Figure 5:
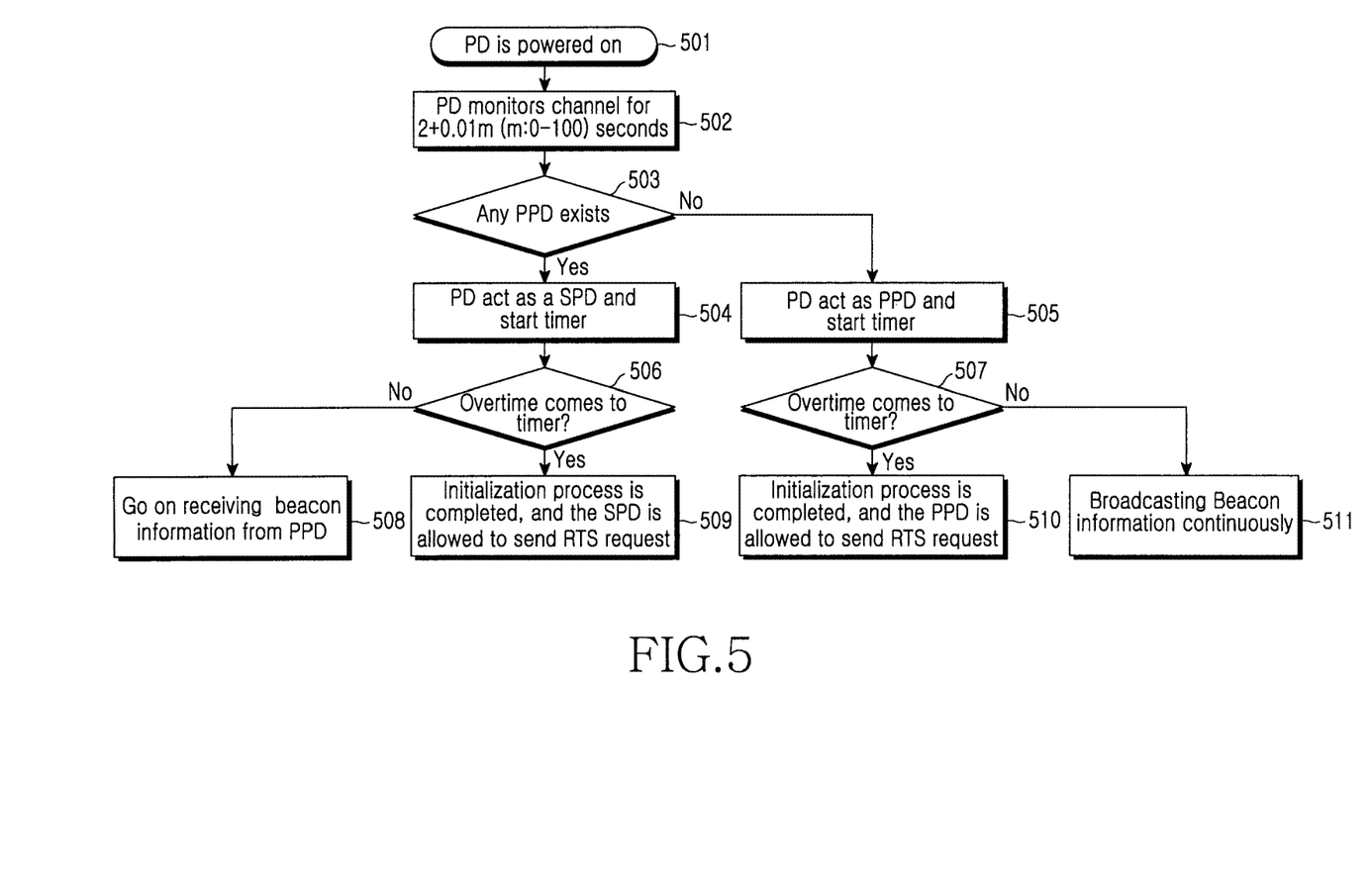

In order to conceive the PD initialization method according to present invention more clearly, an operation flow that a new PD of present invention from powering on to an end of the initialization procedure is illustrated in FIG. 5. By FIG. 5, the IEEE802.22.1 PD initialization according to present invention may include following steps:

1. the PD is Powered on (501);
2. The PD identifies the channel needed to be monitored, then continuously monitors this channel for 2+0.01 m (m∈ [0,100]) seconds (502) so as to determine whether there exists any PPD around or not (503);
3. If some PPD already exists in this channel, the PD acting as an SPD and enabling the timer (504). If no overtime comes to the timer (506), the PD receives Beacon information (508) from PPD. If the timer (506) is time out, the initialization process completes and the SPD is allowed to the transmit request information (509) from now on;
4. In step 3, if no PPD exists in current channel, the PD acts as a PPD and enables the timer (505). If no overtime comes to the timer (507), the PD goes on broadcasting the Beacon information (511) as shown in FIG. 2 continuously. And if the timer (507) is time out, the initialization process completes and the PPD is allowed to receive request information (the structure of the Beacon frame is illustrated in FIG. 1) or Beacon information (510) from the SPD.

What is claimed is:

1. A method for initializing a protection device (PD) in a wireless regional area network (WRAN), the method comprising:
    searching a channel for determining an existence of a primary protecting device (PPD) for a predetermined period;
    if the PD determines that there is not the PPD on the channel, acting as the PPD and broadcasting beacon information; and
    if the PD determines that there is the PPD on the searched channel, acting as a secondary beacon transmission device (SPD) and attempting to contact the PPD,
    wherein the PPD or the SPD operates based on a super frame structure which consists of a succession of 31 slots,
    wherein each slot is comprised of 32 differential quadrature phase shift keying (DQPSK) symbols,
    wherein, if the PD acts as the PPD, the PPD starts a timer and broadcasts the beacon information until the timer is expired, and if the timer is expired, completes an initialization process, and the PPD is allowed to receive a beacon request or beacon information from the SPD, and
    wherein the beacon request includes a structure of a beacon frame.

2. The method according to claim 1, wherein, if the PD acts as the SPD, the SPD starts the timer, receives the beacon information from the PPD until the timer is expired, and if the timer is expired, completes an initialization process, and the SPD is allowed to transmit a beacon request to the PPD.

3. The method according to claim 1, wherein the at least one frequency band is not used in at least one region.

4. The method according to claim 1, wherein the PD, the PPD and the SPD are licensed devices operating in the channel corresponding to television broadcast bands.

5. The method according to claim 4, wherein each of the PD, the PPD, and the SPD is included in a respective microphone that includes a wireless microphone receiver and a wireless microphone transmitter.

6. The method according to claim 1, wherein the PPD or the SPD operates based on a super frame structure divided into two logical channels comprising a synchronization channel and a beacon channel.

7. The method according to claim 1, wherein, if the PD determines that there is the PPD on the searched channel, the SPD is allowed to transmit a beacon request based on a predetermined timer.

8. The method according to claim 1,
wherein the WRAN uses frequency bands comprising at least one frequency band which is selected from among the frequency bands for a broadcast service, and
wherein the at least one frequency band is not used in at least one region.

9. The method according to claim 1, wherein the predetermined period is determined as a sum of a reference value and integers included in a predefined range.

10. A protection device (PD) initialized in a wireless regional area network (WRAN), the PD comprising:
a channel monitoring decision maker configured to search a channel for determining an existence of a primary protection device (PPD) continuously for a predetermined period; and
a controller configured to:
if the controller determines that there is a PPD on the searched channel, control the PD to act as a secondary beacon transmission device (SPD) and attempt to contact the PPD, and
if the controller determines that there is not the PPD on the channel, control the PD to act as the PPD and broadcast beacon information,
wherein the PPD or the SPD operates based on a super frame structure which consists of a succession of 31 slots,
wherein each slot is comprised of 32 differential quadrature phase shift keying (DQPSK) symbols,
wherein, if the PD acts as the PPD, the controller is further configured to:
start a timer, and
broadcast the beacon information until the timer is expired,
wherein, if the timer is expired, the controller is further configured to:
complete an initialization process, and
allow the PPD to receive a beacon request or beacon information from the SPD, and
wherein the beacon request includes a structure of a beacon frame.

11. The PD according to claim 10,
wherein, if the PD acts as the SPD, the controller is further configured to:
start the timer and receive the beacon information from the PPD until the timer is expired, and
wherein, if the timer is expired, the controller is further configured to:
complete an initialization process and allow transmission of a beacon request to the PPD.

12. The PD according to claim 10, wherein the at least one frequency band is not used in at least one region.

13. The PD according to claim 10, wherein the PD, the PPD and the SPD are licensed devices operating in the channel corresponding to television broadcast bands.

14. The PD according to claim 13, wherein each of the PD, the PPD, and the SPD is included in a respective microphone that includes a wireless microphone receiver and a wireless microphone transmitter.

15. The PD according to claim 10, wherein the PPD or the SPD operates based on a super frame structure divided into two logical channels comprising a synchronization channel and a beacon channel.

16. The PD according to claim 10, wherein, if the controller determines that there is the PPD on the searched channel, the SPD is allowed to transmit a beacon request based on a predetermined timer.

17. The PD according to claim 10,
wherein the WRAN uses frequency bands comprising at least one frequency band which is selected from among the frequency bands for a broadcast service, and
wherein the at least one frequency band is not used in at least one region.

18. The PD according to claim 10, wherein the predetermined period is determined as a sum of a reference value and integers included in a predefined range.

* * * * *